Jan. 2, 1951    C. GERST    2,536,737
REVERSIBLE POWER TRANSMISSION
Filed March 25, 1948    4 Sheets-Sheet 1
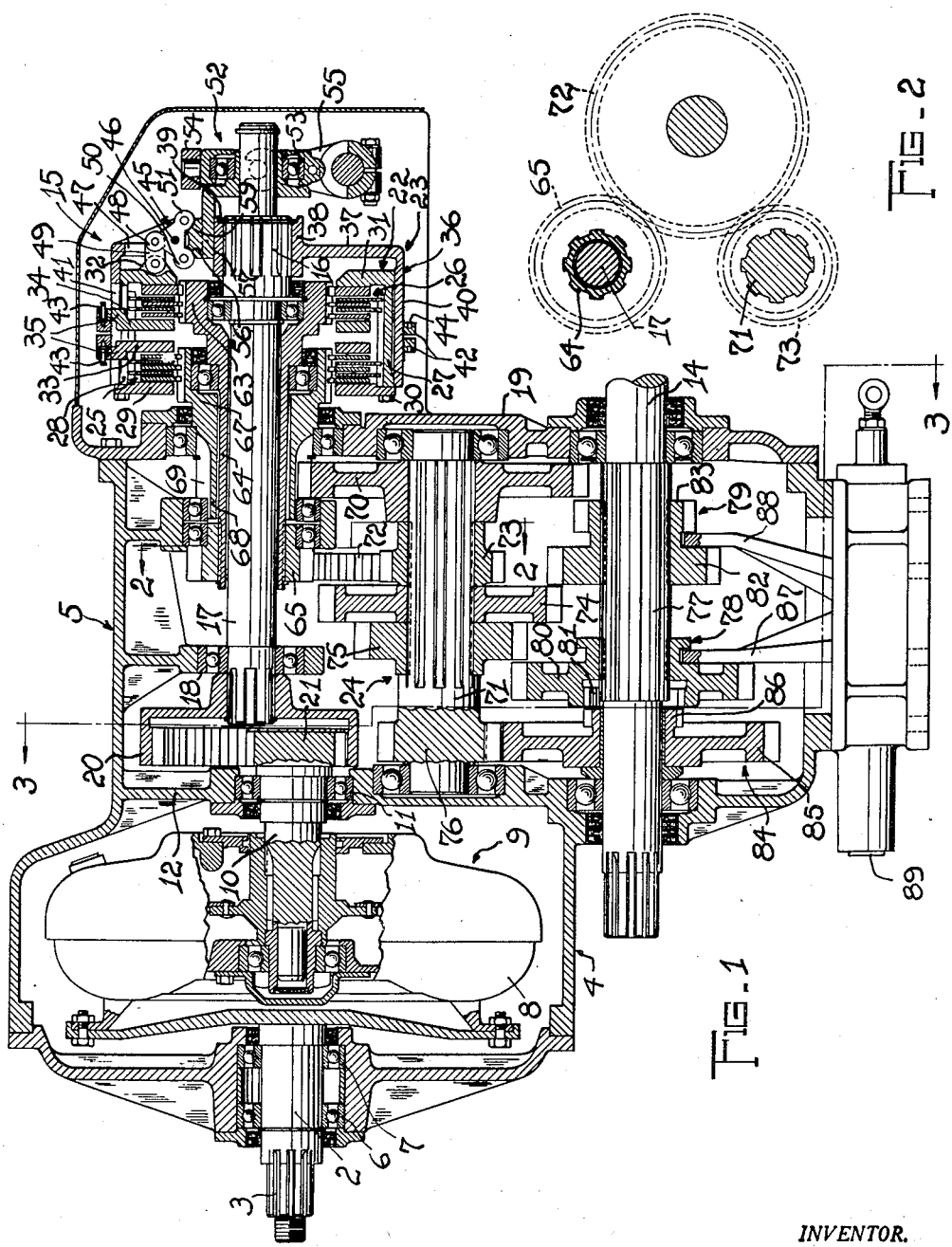
INVENTOR.
CHRIS GERST
BY
ATT.

Jan. 2, 1951 C. GERST 2,536,737
REVERSIBLE POWER TRANSMISSION

Filed March 25, 1948 4 Sheets-Sheet 4

INVENTOR.
CHRIS GERST
BY
Gustav A. Wolf
ATT

Patented Jan. 2, 1951

2,536,737

UNITED STATES PATENT OFFICE 2,536,737

REVERSIBLE POWER TRANSMISSION

Chris Gerst, Detroit, Mich., assignor to The Transmission & Gear Company, Dearborn, Mich., a corporation of Michigan Application March 25, 1948, Serial No. 17,052

5 Claims. (Cl. 74—730)

The present invention relates to reversible power transmission for heavy duty purposes and its primary object is the provision of a reversible power transmission in which an engine, through fluid, torque-converting mechanism and gearing, is indirectly coupled with an output shaft to effect operation of the engine at or near its peak torque, while allowing the torque-converting mechanism, driven by the engine, to deliver an output torque in accordance with the loads and speeds of the impeller, and changing the net speed ratio between the torque converting mechanism and the output shaft with gearing providing forward and reverse rotation of the output shaft at several different speeds.

Another object of the invention is the provision of a reversible power transmission in which an engine, through fluid, torque-converting mechanism and gearing, is indirectly coupled with an output shaft to effect operation of the engine at or near its peak torque while allowing the torque-converting mechanism, driven by the engine, to deliver an output torque in accordance with the loads and speeds of the impeller, and changing the net speed ratio between the torque-converting mechanism and the output shaft for both forward and reverse rotation of said shaft by the gearing, the gearing including dual friction clutch means mounted on a countershaft coupled with the torque-converting mechanism by an internal gear and pinion arrangement.

A further object of the invention is the provision of a reversible power transmission in which an engine through fluid, torque-converting mechanism and gearing, is coupled with an output shaft to effect operation of the engine at or near its peak torque while allowing the torque-converting mechanism, driven by the engine, to deliver an output torque in accordance with the loads and speeds of the impeller, and changing the net speed ratio between the torque-converting mechanism and the output shaft for both forward and reverse rotation of said shaft by the gearing, and in which the gearing is arranged in a gear box housing journaling a countershaft coupled at one end by an internal gear and pinion arrangement with the torque-converting mechanism and extended with its other end through the wall of the gear box housing to mount on its extended portion dual friction clutch means controlling the forward and reverse rotation of the output shaft.

The above and other inherent objects and advantages of the present invention will be more apparent from the following detailed description which, taken in conjunction with the accompanying drawings, will disclose to those skilled in the art the particular construction and operation of several preferred forms of the present invention.

In the drawings:

Fig. 1 is a longitudinal sectional view, partly in elevation, through a reversible transmission constructed in accordance with the invention, the section being taken on lines 1—1 and 1a—1a of Fig. 3.

Fig. 2 is a somewhat schematic, cross-sectional showing through the transmission, the section being taken on line 2—2 of Fig. 1.

Figure 3:
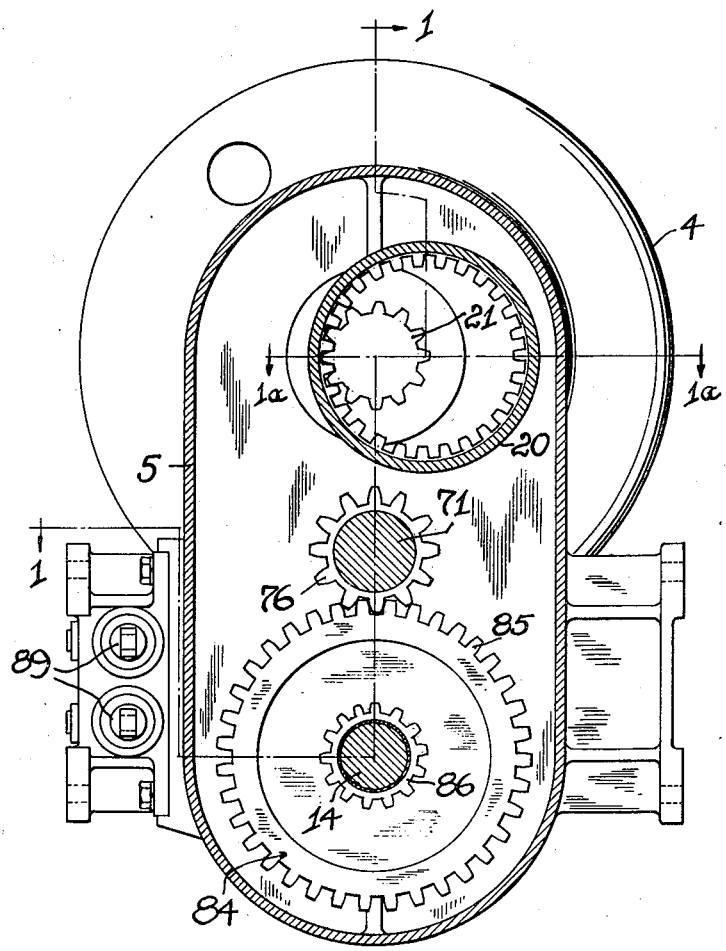
Fig. 3 is a cross-sectional view through the transmission, the section being taken on line 3—3 of Fig. 1.

Referring now more in detail to the exemplified form of the invention shown in Figs. 1 through 3, the input or power shaft 2 of the transmission is connected directly or indirectly to an engine (not shown), by the splined portion 3 of said shaft, which is supported in an extension 4 of gear housing 5 by roller bearings 6 and 7 and connected to the impeller unit 8 of a fluid turbine torque converter 9 of standard contruction. A detailed description of this fluid turbine torque converter is not deemed necessary as other standard forms of continuously-variable torque converters may be used in the disclosed combination. The torque converter 9 includes an output shaft 10 journaled in roller bearing 11 in wall 12 of gear housing 5, and this output shaft is coupled with output shaft 14 of the transmission by a dual friction clutch unit 15 of the type disclosed in my copending applications, Serial No. 728,842 filed February 15, 1947 and Serial No. 784,681 filed November 7, 1947, which type of dual friction clutch includes a pressure plate structure with axially spaced pressure plates, and a backing plate structure positioned between the pressure plates for cooperation of the pressure plate structure with the backing plate structure in selectively actuating clutch disk assemblies of the dual friction clutch unit by shifting the pressure plate structure in opposite directions. Thus the dual friction clutch unit is mounted on the splined portion 16 of a countershaft 17, which is journaled in gear housing 5 by roller bearing 18 and has the splined portion 16 extended outwardly through side plate 19 of said housing. The countershaft 17 supports on its other end an internal gear 20 which meshes a pinion 21 on the output shaft 10 and thus couples said output shaft with dual friction clutch unit 15.

This dual friction clutch unit embodies a pressure plate structure 22 and a backing plate structure 23 slidably and non-rotatably coupled with each other for joint rotation by countershaft 17. These pressure plate and backing plate structures are non-rotatably and axially shiftably interengaged with each other, so that the backing plate structure 23 is arranged substantially within the pressure plate structure to effect selective coupling of countershaft 17 over gearing 24 by either one of two individual clutch disk assemblies 25 and 26 arranged within the pressure plate structure at opposite sides of the backing plate structure.

The pressure plate structure 22 consists of a cylindrical body member 27, the peripheral wall of which is slotted to provide body member 27 with radial slots 28. Body member 27 has one end partly closed by a ring-shaped plate 29 secured by bolts 30 to body member 27 and has its other end inwardly flanged to provide the body member with a flanged portion 31 opposed to ring-shaped plate 29. In addition body member 27 includes ear portions 32 integrally extended from the outside face of flanged portion 31.

The backing plate structure 23, which includes backing plates 33, 34 positioned between the ring-shaped plate 29 and the flanged portion 31 of the pressure plate structure, is slidably and non-rotatably engaged with the peripheral wall of cylindrical body member 27 of the pressure plate structure by radial driving lugs 35 on backing plates 33 and 34, which lugs are extended through the radial slots 28. This backing plate structure embodies a cup-shaped body 36 which is dimensioned to be sleeved upon the body member 27 of the pressure plate structure and has extended from its wall 37 an internally splined hub member 38 mounting the cup-shaped body 36 on the splined portion 16 of the countershaft 17 and securely held in proper position by a snap ring 39. The peripheral wall 40 of body 36 is threaded and, in addition, radially slotted to provide this wall with radial slots 41, sized and arranged to fit and align with the radial slots 28 in body member 27 to permit proper engagement of body 36 with the driving lugs 35 on backing plates 33 and 34, which plates are held in proper position by adjustment rings 42 threadedly engaged with the threaded peripheral wall of body 36 and held in adjusted position by spring-pressed plungers 43 extended into bores 44 in the side walls of the adjustment rings.

The pressure plate structure, which is thus slidably and non-rotatably supported by the backing plate structure, is shifted in opposite directions to actuate either one of the two clutch disk assemblies 25 and 26 by dual clutch levers 45 pivotally mounted on shafts 46 in slots 47 of body 36. These dual clutch levers include a third lever arm 48 linking the dual clutch levers to the ear portions 32 of body 27 by means of links 49 extended through slots 47. The dual clutch levers 45 each embody at their opposite ends rollers 50 and 51 and are actuated by a shifting member 52 which is coupled by a ball bearing 53 with a throw-out collar 54 actuated by a fork 55. This shifting member is slidably mounted on the reduced end portion f countershaft 17 and when shifted toward the dual clutch structure engages the inclined surfaces 56 of its extended jaw members 57 with the rollers 50 of the dual clutch levers 45 and effects tilting of these levers and therewith shifting of the pressure plate structure toward the right until the clutch disk assembly 25 is tightly gripped between ring-shaped plate 29 and backing plate 33. Shifting of member 52 in the opposite direction, away from the dual friction clutch unit 15 effects engagement of rollers 51 of dual clutch levers 45 with the oppositely inclined surface 59 of jaw members 57 and therewith tilting of these levers and shifting of the pressure plate structure toward the left until the clutch disk assembly 26 is tightly gripped between the flanged portion 31 and backing plate 34. The shifting member 52 is slidably and non-rotatably coupled with the backing plate structure by dimensioning the jaws so that these jaws snugly and slidably fit the slots 47 in body 36.

As stated before dual friction clutch unit 15 is mounted on the splined portion 16 of countershaft 17 and permits selective coupling of its clutch disk assemblies 25 and 26 over gearing 24 with the output shaft 14 of the transmission. For such purpose clutch disk assemblies 25 and 26 include friction driving disks which are non-rotatably and axially shiftably engaged with the toothed inner wall of body member 27. The driving disks of clutch disk assembly 26 cooperate with the friction driven disks of said clutch, which latter disks are non-rotatably and axially shiftably engaged with the enlarged splined end portion 63 of a tubular shaft 64, mounting at its end a pinion 65 and concentrically encircling the countershaft 17. The driving disks of clutch disk assembly 25 cooperate with friction driven disks which are non-rotatably and axially shiftably engaged with the enlarged splined end portion 67 of another tubular shaft 68 which includes a gear portion 69 and concentrically encircles tubular shaft 64 and countershaft 17. Tubular shaft 68, the forward drive shaft, meshes with its gear portion 69 a large gear 70 on a second countershaft 71, and tubular shaft 64, the reverse drive shaft, is coupled by its pinion 65 over an idler gear 72 with a small gear 73 also mounted on the second countershaft 71. In addition countershaft 71 mounts two other gears 74 and 75 and includes at its one end portion a pinion 76. The arrangement of gears 70, 74, 75 and pinion 76 on countershaft 71 permits selective coupling of this shaft with output shaft 14 at four different speeds. Thus output shaft 14 has shiftably mounted on its splined portion 77 two double gears 78 and 79, double gear 78 including a large gear 80 and an internal gear 81 and double gear 79 including a large gear 82 and a small gear 83. In addition output shaft 14 has freely rotatably mounted thereon near its one end portion adjacent a double gear 78 a double gear 84, which includes a large gear 85 meshing pinion 76 of countershaft 71 and a small gear 86. The two double gears 78 and 79 are shifted by fork members 87 and 88, respectively, which are mounted on shafts 89 to be actuated in any suitable and standard manner.

In operation, when input shaft 2 is rotated by an engine, torque converter 9 transfers through pinion 21 on output shaft 10 rotation to internal gear 20 mounted on countershaft 17 which in turn mounts the dual friction clutch unit 15. Actuation of this clutch unit effects coupling of countershaft 17 by clutch disk assemblies 25 and 26 with either tubular shaft 68, the forward drive shaft, or tubular shaft 64, the reverse drive shaft, and therewith rotation of countershaft 71 in forward or reverse rotation. Such rotation of countershaft 71 is transferred to the output shaft 14 by a plurality of gears, to wit, gears 73, 74, 75 and pinion 76 cooperating with the two double gears 18 and 79, in rotating the output shaft at four different speeds for both forward and reverse rotation of such output shaft according to the actuation of clutch disk assemblies 25 and 26.

Figure 4:
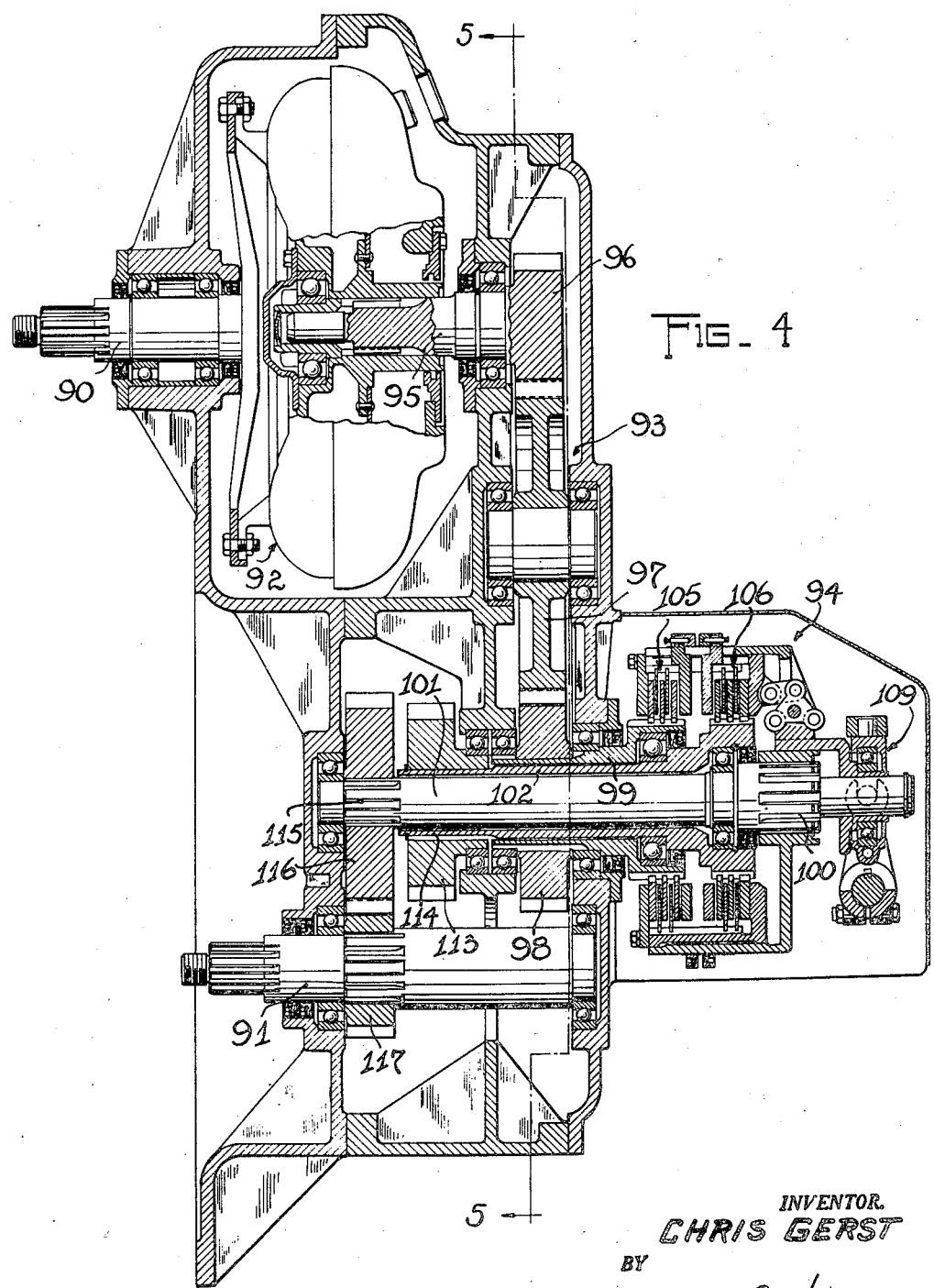
Fig. 4 is a longitudinal sectional view partly in elevation through a somewhat modified form of reversible transmission constructed in accordance with the invention, the section being taken on line 4—4 of Fig. 5.
Figure 5:
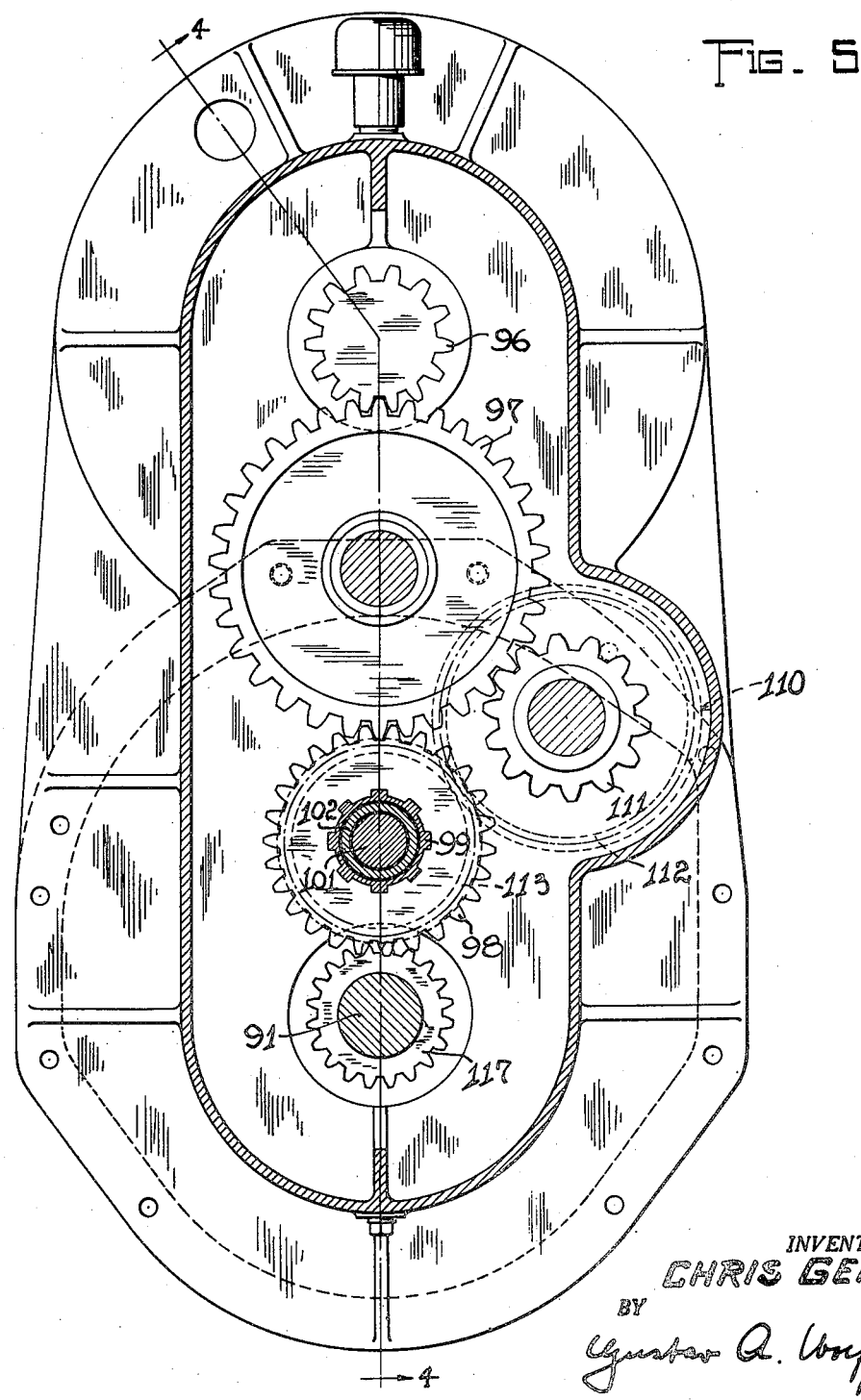
Fig. 5 is a cross-sectional view through the transmission shown in Fig. 4, the section being taken on line 5—5 of Fig. 4.

In the modified form of transmission shown in Figs. 4 and 5 of the drawings, the input or power shaft 90 of the transmission transfers its power to output shaft 91 through the combined action of a torque converter 92 and gearing 93 including a dual friction clutch unit 94. For such purpose torque converter 92 has mounted on its output shaft 95 a pinion 96 meshing an idler gear 97 which in turn meshes a gear 98 mounted on the tubular shaft 99, the forward drive shaft of dual friction clutch unit 94. In this case dual friction clutch unit 94 is mounted on the splined end portion 100 of a driven countershaft 101 which is selectively driven in forward or reverse direction by tubular shaft 99 and a second tubular shaft 102, both of which concentrically encircle the driven countershaft 101 and are coupled with said countershaft when the respective friction driving disks of friction disk assemblies 105 and 106 are brought into frictional contact with their friction driven disks by a shifting member 109 which effects actuation of the clutch disk assemblies in a manner similar to the previously described actuation of clutch disk assemblies 25 and 26 so that further description is unnecessary. The tubular shaft 102, the reverse drive shaft, is coupled for reverse rotation with idler gear 97 by a double idler gear 110, the gear 111 of which meshes idler gear 97 and the gear 112 of which meshes a gear 113 mounted on the splined end portion 114 of said tubular shaft.

Driven countershaft 101 mounts on its splined portion 115 a gear 116 which meshes a gear 117 mounted on the output shaft 91 of the transmission. For forward rotation of output shaft 91, input shaft 90 transfers motion through torque converter 92, its pinion 96, idler gear 97 and gear 98 to the forward drive tubular shaft 99, hence through clutch disk assembly 105 to driven countershaft 101 and finally through gears 116 and 117 to the output shaft 91; and for reverse rotation of output shaft 91, input shaft 90 transfers motion through torque converter 92, its pinion 96, idler gear 97, double idler gear 110 and gear 113 to the reverse drive tubular shaft 102, hence through clutch disk assembly 106 to driven countershaft 101 and finally through gears 116 and 117 to the output shaft.

Having thus described my invention, what I claim is:

1. In a power transmission a housing, an output shaft mounted in said housing, a fluid torque converting mechanism mounted in said housing and having an input shaft arranged vertically above said output shaft, a forward and reverse gear unit including a main shaft connected by an internal gear and pinion arrangement with the output shaft of said torque converting mechanism, said main shaft extending outside of said housing and mounting a dual friction clutch device forming part of said forward and reverse gear unit, said forward and reverse gear unit including a countershaft geared to said dual friction clutch device and the output shaft of said transmission to effect selective forward and reverse rotation of said output shaft by actuation of said dual friction clutch device at speeds proportionate to the output torque of said fluid torque converting mechanism.

2. In a power transmission a housing, an output shaft mounted in said housing, a fluid torque converting mechanism having an input shaft, and a forward and reverse gear unit including two tubular shafts and a main shaft encircled thereby and coupled by an internal gear and pinion arrangement with said torque converting mechanism, said gear unit having said main shaft and said two tubular shafts extended through a wall of said housing, said main shaft mounting on its extended portion a dual friction clutch device adapted to selectively couple the main shaft with said tubular shafts, and said tubular shafts being geared to each other for rotation in opposite directions and geared to said output shaft for effecting forward and reverse rotation of said output shaft by actuation of the dual friction clutch device at speeds proportionate to the output torque of said fluid torque converting mechanism.

3. In a power transmission a housing, a fluid torque converting mechanism in said housing having an input shaft extended from said housing at one side thereof, a forward and reverse gear unit including intersleeved coaxial shaft members in said housing extended outwardly thereof through a wall opposite to the said one side of the housing, one of said shaft members being coupled with said fluid torque converting mechanism by an internal gear and pinion arrangement, a dual friction clutch device mounted on the said one shaft member and adapted to selectively couple either one of two of said shaft members with said one shaft member, and an output shaft driven by said geared unit for selective forward and reverse rotation of the output shaft by actuation of said dual friction clutch device at speeds proportionate to the output torque of said fluid torque converting mechanism.

4. In a power transmission a housing, a fluid torque converting mechanism in said housing having an input shaft extended from said housing, a forward and reverse step ratio gear unit including intersleeved, coaxial shaft members coupled with said fluid torque converting mechanism by an internal gear and pinion arrangement and extended outwardly of said housing, actuating means for said forward and reverse step ratio gear unit, a dual friction clutch device mounted on the extended portion of one of said shafts and adapted to selectively couple either one of two of said shaft members with the said one shaft member, and an output shaft driven by said gear unit for selectively forward and reverse rotation of the output shaft at speeds proportionate to the output torque of the fluid torque converting mechanism.

5. In a power transmission an input shaft, an output shaft, a fluid torque converting mechanism coupled with said input shaft, and a forward and reverse gear unit connecting said torque converting mechanism with said output shaft, said gear unit including gearing, a dual friction clutch arrangement and three axially aligned shafts one of which is connected by an internal gear and pinion arrangement with said fluid torque converting mechanism and the other two of which are adapted to be selectively coupled by said clutch arrangement with said gearing for forward and reverse rotation of said output shaft proportionate to the output torque of the fluid torque converting mechanism.

CHRIS GERST.

REFERENCES CITED

The following references are of record in the file of this patent:

UNITED STATES PATENTS

| Number | Name | Date |
|---|---|---|
| 2,138,618 | Seyerle | Nov. 29, 1938 |
| 2,171,255 | Keeler | Aug. 29, 1939 |
| 2,187,967 | Fawick | Jan. 23, 1940 |
| 2,437,430 | Lawrence | Mar. 9, 1948 |
| 2,443,313 | Gerst | June 15, 1948 |
| 2,448,345 | Aronson | Aug. 31, 1948 |
| 2,459,705 | Julien | Jan. 18, 1949 |

FOREIGN PATENTS

| Number | Country | Date |
|---|---|---|
| 68,173 | Norway | July 31, 1944 |
| 142,575 | Germany | July 10, 1903 |
| 391,348 | France | Oct. 28, 1908 |
| 391,882 | Great Britain | May 11, 1933 |
| 392,572 | Great Britain | May 15, 1933 |

OTHER REFERENCES

Publication: Hydraulic Drives, Twin Disc Clutch Company, Bulletin No. 132.